(12) United States Patent
Ross et al.

(10) Patent No.: US 12,612,289 B2
(45) Date of Patent: Apr. 28, 2026

(54) VEHICLE-MOUNTED GAME ANIMAL LIFT DEVICE

(71) Applicants: Arthur Ross, Winnsboro, LA (US); Ollie Ross, Winnsboro, LA (US)

(72) Inventors: Arthur Ross, Winnsboro, LA (US); Ollie Ross, Winnsboro, LA (US)

( * ) Notice: Subject to any disclaimer, the term of this patent is extended or adjusted under 35 U.S.C. 154(b) by 294 days.

(21) Appl. No.: 17/734,143

(22) Filed: May 2, 2022

(65) Prior Publication Data

US 2023/0276787 A1 Sep. 7, 2023

Related U.S. Application Data

(60) Provisional application No. 63/317,032, filed on Mar. 6, 2022.

(51) Int. Cl.
| | |
|---|---|
| *B66D 1/04* | (2006.01) |
| *A01M 31/00* | (2006.01) |
| *B60R 9/06* | (2006.01) |
| *B60R 11/00* | (2006.01) |

(52) U.S. Cl.
CPC ............. *B66D 1/04* (2013.01); *A01M 31/006* (2013.01); *B60R 9/06* (2013.01); *B60R 2011/0071* (2013.01)

(58) Field of Classification Search
CPC ....... B66D 1/04; B66C 23/166; A01M 31/006
See application file for complete search history.

(56) References Cited

U.S. PATENT DOCUMENTS

| | | | | |
|---|---|---|---|---|
| 5,522,582 | A * | 6/1996 | Dilks | B66D 1/40 |
| | | | | 254/323 |
| 5,607,143 | A * | 3/1997 | Regal | B66D 1/60 |
| | | | | 254/362 |
| 6,626,748 | B2 * | 9/2003 | Homer, Sr. | A22B 7/006 |
| | | | | 452/192 |
| 7,300,238 | B1 * | 11/2007 | James | B66C 23/44 |
| | | | | 414/543 |
| 7,878,526 | B1 * | 2/2011 | Jantzen | B60D 1/06 |
| | | | | 280/491.5 |
| 7,931,524 | B2 * | 4/2011 | McKenzie | B60P 1/5471 |
| | | | | 452/187 |
| 8,777,703 | B1 * | 7/2014 | Herron | A22B 5/161 |
| | | | | 452/128 |
| 9,630,816 | B1 * | 4/2017 | Napieralski | B66C 19/02 |
| 9,877,490 | B1 * | 1/2018 | Lee | A01M 31/00 |
| 9,999,232 | B1 * | 6/2018 | Poland | A22B 5/06 |
| 10,071,889 | B1 * | 9/2018 | Lopez | B66C 23/166 |

(Continued)

*Primary Examiner* — Victoria P Augustine
*Assistant Examiner* — Nathaniel L Adams
(74) *Attorney, Agent, or Firm* — Brennan, Manna & Diamond, LLC

(57) ABSTRACT

The present invention relates generally to the field of animal lifts. More specifically, the present invention relates to a vehicle-mountable game animal lift device that is primarily comprised of a vertical mast, at least one winch, at least one cable, and at least one hanging bar. The device is durable and made of metal such that it can retain the weight of large game animals and hold them steadily to the device. The device is also comprised of a winch that can easily lift an animal from the ground. In this manner, the device can be attached to any ATV or utility vehicle known in the art such that an individual may lift and transport any fallen game animal out of a hunting area without the assistance of others.

16 Claims, 3 Drawing Sheets

(56)        References Cited

U.S. PATENT DOCUMENTS

| | | | |
|---|---|---|---|
| 2002/0048504 A1* | 4/2002 | Jacobs | B60P 1/5433 |
| | | | 414/541 |
| 2002/0173262 A1* | 11/2002 | Stiefel | A22B 5/161 |
| | | | 452/185 |
| 2005/0175418 A1* | 8/2005 | Johnson | A22B 5/161 |
| | | | 405/263 |
| 2010/0111658 A1* | 5/2010 | Galliano | A01M 31/006 |
| | | | 414/815 |
| 2012/0319065 A1* | 12/2012 | Scott | A22B 5/00 |
| | | | 254/362 |
| 2014/0154936 A1* | 6/2014 | Barrero Lopez | B66D 1/02 |
| | | | 441/89 |

* cited by examiner

140

142

150

152

160

146

144

148

130

100

110

VEHICLE-MOUNTED GAME ANIMAL LIFT DEVICE

CROSS-REFERENCE TO RELATED APPLICATION

The present application claims priority to, and the benefit of, U.S. Provisional Application No. 63/317,032, which was filed on Mar. 6, 2022, and is incorporated herein by reference in its entirety.

FIELD OF THE INVENTION

The present invention relates generally to the field of animal lifts. More specifically, the present invention relates to a vehicle-mountable game animal lift device that is primarily comprised of a vertical mast, at least one winch, at least one cable, and at least one hanging bar. The device is durable and made of metal such that it can retain the weight of large game animals and hold them steadily to the device. The device is also comprised of a winch that can easily lift an animal from the ground. In this manner, the device can be attached to any ATV or utility vehicle known in the art such that an individual may lift and transport any fallen game animal out of a hunting area without the assistance of others. Accordingly, the present disclosure makes specific reference thereto. Nonetheless, it is to be appreciated that aspects of the present invention are also equally applicable to other like applications, devices and methods of manufacture.

BACKGROUND

Many individuals hunt for sport and as a way to bond with family or friends. However, game animals can be heavy, and lifting and transporting the game can be difficult for many people, especially without the assistance of others. Transporting game using some utility vehicle may be efficient but loading the game onto the vehicle may be nearly impossible. It is likely the game animal may need to be dragged through the woods, potentially for long distances, before being able to properly lift and transport the game. Hunters may need to rely on help from others to manage the retrieval and transport of the game out of the woods.

Therefore, there exists a long-felt need in the art for a vehicle-mountable game animal lift device. There also exists a long-felt need in the art for a lift device capable of attaching to any utility vehicle known in the art. Further, there exists a long-felt need in the art for a game animal lift device that allows hunters to independently lift fallen game of any size onto a utility vehicle for transport out of the woods or other hunting area. In addition, there exists a long-felt need in the art for a vehicle-mountable game animal lift device capable of holding the weight of a large animal, such as a large deer, while travelling through rough, uneven terrain.

The subject matter disclosed and claimed herein, in one embodiment thereof, comprises a vehicle-mountable game animal lift device. The device is primarily comprised of a vertical mast, at least one winch, at least one cable, and at least one hanging bar. The device is sturdy and made of metal such that it can support the weight of large game animals that are commonly hunted such as deer, elk, etc. The device is also comprised of a winch that can easily lift the fallen game animal off the ground and suspend the animal from the device, allowing for easy transportation of the animal. In this manner, the device can be attached to any utility vehicle or ATV such that a fallen game animal may be lifted and transported out of a hunting area without the need for assistance from other people.

In this manner, the vehicle-mountable game animal lift device of the present invention accomplishes all the foregoing objectives and provides a means for one user to lift, and transport fallen game out of a hunting area independently. Further, the device can attach to any utility vehicle known in the art such that, any terrain or land from which the game was caught may be transported over, preventing the need for the game to be dragged large distances. In addition, the device, can securely and sturdily retain the weight of any large animal commonly hunted to safely transport the animal away from the hunting area.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle-mountable game animal lift device. The device is primarily comprised of a vertical mast, at least one winch, at least one cable, and at least one hanging bar. In differing embodiments, the device may be made of a plurality of materials commonly used for lifting and transporting mechanisms. However, the device is preferably made of metal. In addition, any surface of the device may be comprised of a plurality of indicia such as patterns, logos, emblems, images, symbols, designs, letters, words, characters, animals, advertisements, brands, etc.

Further, the device is comprised of a vertical mast which is further comprised of a first end and a second end. The first end allows the device to attach to any utility vehicle known in the art via a generally L-shaped mounting bracket. The second end of the device is comprised of a winch which is further comprised of a crank handle, at least one cable, and at least one clip. The crank handle may be cranked to lift the clip at the end of the cable upward. The clip may attach to an eyelet of a hanging bar from which a fallen game animal, such as a deer, may be attached. By cranking the crank handle, the game animal may be lifted off the ground for easy transportation. In one potential embodiment, the winch may be powered by a motor. At least one but preferably two buttons may control the motor to allow for the motor to spin in both the clockwise and counterclockwise directions for lifting game animals and letting them down.

Accordingly, the vehicle-mountable game animal lift device of the present invention is particularly advantageous as it allows an individual to lift fallen game onto a vehicle such that it can be transported out of a hunting area. Further, the device can securely and sturdily retain the weight of both large and small game animals commonly hunted to safely transport the animal away from the hunting area. In addition, the device can attach to any ATV or utility vehicle known in the art such that the game animal may be transported over any terrain. In this manner, the vehicle-mountable game animal lift device overcomes the limitations of existing animal lifts known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
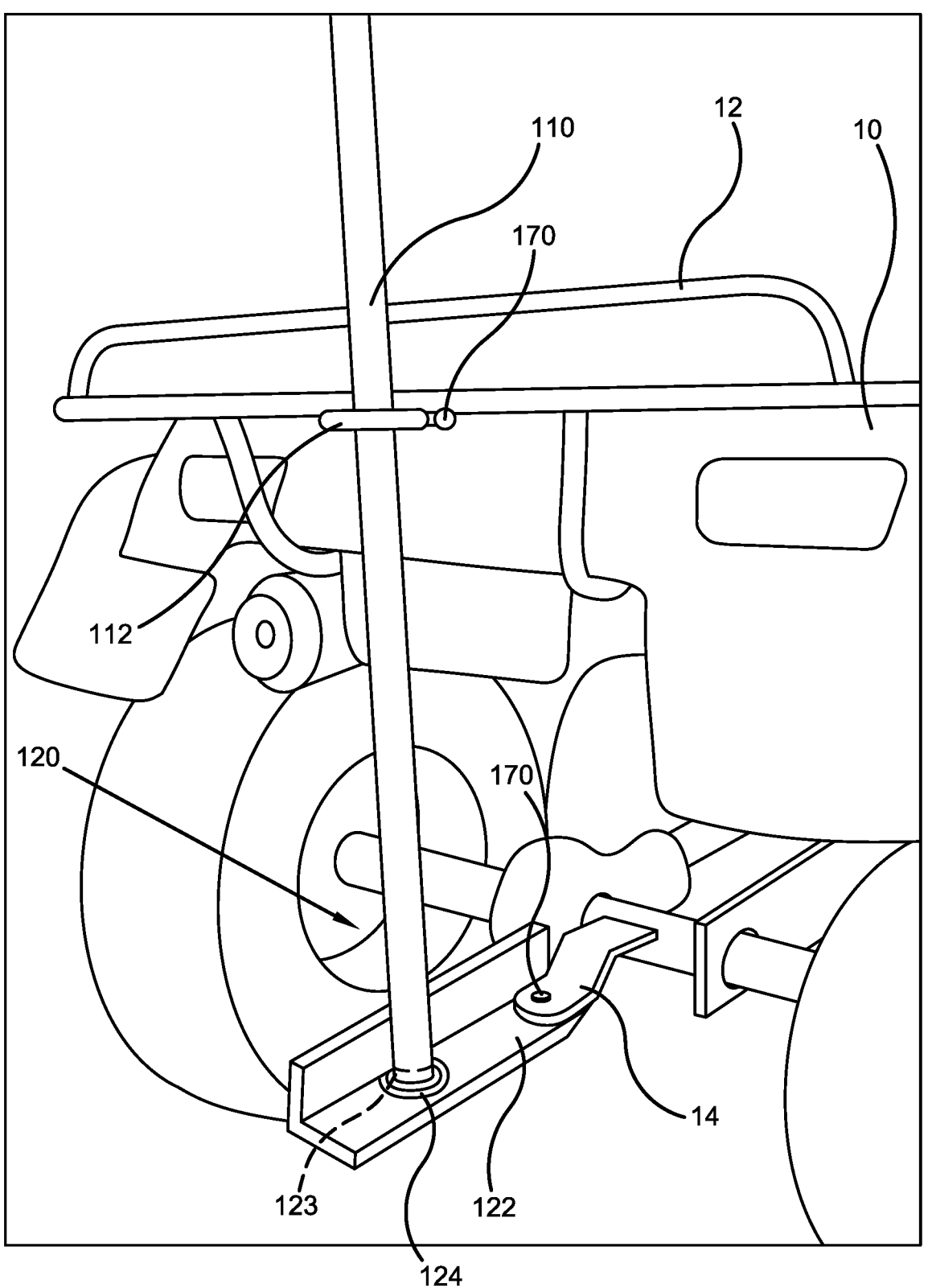
FIG. 1 illustrates a perspective view of the vertical mast and mounting bracket of one potential embodiment of a vehicle-mountable game animal lift device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a vehicle-mountable game animal lift device. There also exists a long-felt need in the art for a lift device capable of attaching to any utility vehicle known in the art. Further, there exists a long-felt need in the art for a game animal lift device that allows hunters to independently lift fallen game of any size onto a utility vehicle for transport out of the woods or other hunting area. In addition, there exists a long-felt need in the art for a vehicle-mountable game animal lift device capable of holding the weight of a large animal, such as a large deer, while travelling through rough, uneven terrain.

The present invention, in one exemplary embodiment, is comprised of a vehicle-mountable game animal lift device that may attach to any utility vehicle, allowing an individual to lift and transport fallen game, such as a deer, out of a hunting area. The device is primarily comprised of a vertical mast, at least one winch, at least one cable, and at least one hanging bar. In differing embodiments, the device may be made of a plurality of materials that may be commonly used for lifting or transportation mechanisms but is preferably made of a metal material. In addition, any surface of the device may be comprised of a plurality of indicia such as patterns, logos, emblems, images, symbols, designs, letters, words, characters, animals, advertisements, brands, etc.

Further, the device is comprised of a vertical mast which is further comprised of a support bracket and two ends, a first end and a second end. The first end may be further comprised of a mounting bracket that allows the device to be attached to an ATV or other vehicle known in the art. The mounting bracket may be generally L-shaped and may attach to the toe hitch or any other area of the vehicle via an at least one fastener. In addition, the vertical mast may be attached to a vehicle via the support bracket. The support bracket may attach to a rack of the vehicle via an at least one fastener to provide further stabilization for the device.

The second end of the device is comprised of a winch. The winch may be comprised of an at least one crank handle, an at least one cable, and an at least one clip. By cranking the crank handle, the winch may pull on the cable, raising the clip on the end of the cable upwards. The clip may attach to a hanging bar via an at least one eyelet. Once a game animal has fallen, the device may be driven towards the game animal via an ATV or other vehicle, such that the game animal may be attached to the hanging bar via an at least one rope. The rope may be used to tie various parts of the body of the game animal to the hanging bar. Once the game animal is attached to the hanging bar and the hanging bar attached to the clip of the winch, the game animal may be raised into the air by cranking the winch, allowing for easy transport of the game animal. In one potential embodiment, the winch may be powered by a motor to assist in the lifting of heavier animals. In that embodiment, the motor may be attached to the second end of the vertical mast or the winch itself. The motor may be powered by a battery and be controlled by an at least one button that controls the rotation of the motor such that the device can easily lift and let down the game animal. In another potential embodiment, the winch may be comprised of both a crank handle and a motor, allowing the user to choose between manual or automatic lifting of the game animal. In this embodiment, the user may be able to lift the animal in the case of the battery being dead.

Accordingly, the vehicle-mountable game animal lift device of the present invention is particularly advantageous as it allows an individual to lift fallen game onto a vehicle such that it can be transported out of a hunting area. Further, the device can attach to any utility vehicle known in the art such that individuals may hunt on any terrain of land knowing a game animal will be able to be lifted and transported easily away from the hunting area. In addition, the device can securely and sturdily retain the weight of commonly hunted game animals to safely transport the animal away from the hunting area. Therefore, the device eliminates the need for multiple people to assist in lifting or transporting the game animal once it has fallen.

Referring initially to the drawings, FIG. 1 illustrates a perspective view of the vertical mast 110 and mounting bracket 122 of one potential embodiment of a vehicle-mountable game animal lift device 100 of the present invention in accordance with the disclosed architecture. The device is primarily comprised of a vertical mast 110, at least one winch 140, at least one cable 150, and at least one hanging bar 160. In differing embodiments, the device 100 may be made of a plurality of materials such as wood or plastic, but the device 100 is preferably made of a metal such as, but not limited to: steel, stainless steel, carbon steel, alloy steel, wrought iron, cast iron, aluminum, magnesium, copper, brass, bronze, zinc, titanium, tungsten, nickel, cobalt, etc. Further, the device 100 may be of any length, width, height, or other dimension to accommodate the needs of the user and differing sizes of vehicle and/or game animal.

The device 100 is primarily comprised of a vertical mast 110 which is further comprised of a support bracket 112, a first end 120, and a second end 130. The first end 120 of the vertical mast 110 may be fixedly or removably attached to at least one mounting bracket 122 via an at least one fastener 170, welding, or any other method. The fastener 170 may be any fastener 170 such as, but not limited to: a hinge, a screw, a bolt, a magnet 123, a hook-and-loop fastener, a glue 124, etc., or any combination of fastener. The mounting bracket 122 may be of any shape and size, but in the preferred embodiment of the device 100 is generally L-shaped. Further, the mounting bracket 122 may attach via an at least one fastener 170 to the tow hitch 14 of an ATV 10 or other vehicle such as, but not limited to: a vehicle, a golf cart, a UTV, a side by side, a tractor, or any other wheeled vehicle known in the art. In addition, the vertical mast 110 may be attached to the ATV 10 or other vehicle known in the art via an at least one support bracket 112. The support bracket 112 may attach to the rack 12 of an ATV 10 or vehicle near the center of the vertical mast 110 to provide further stabilization and structural support to the device 100.

Figure 2:
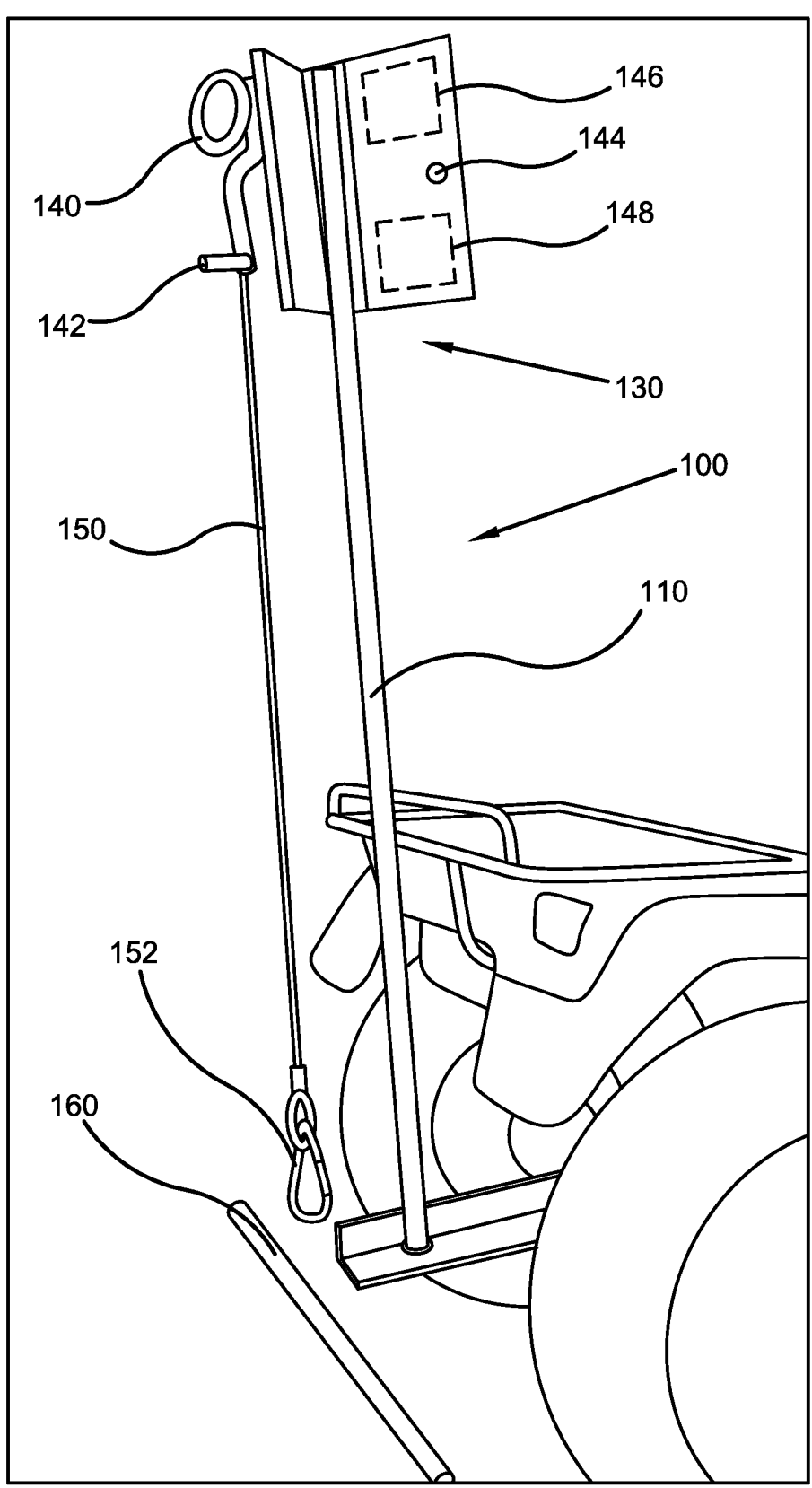
FIG. 2 illustrates a perspective view of one potential embodiment of a vehicle-mountable game animal lift device of the present invention in accordance with the disclosed architecture.
Figure 3:
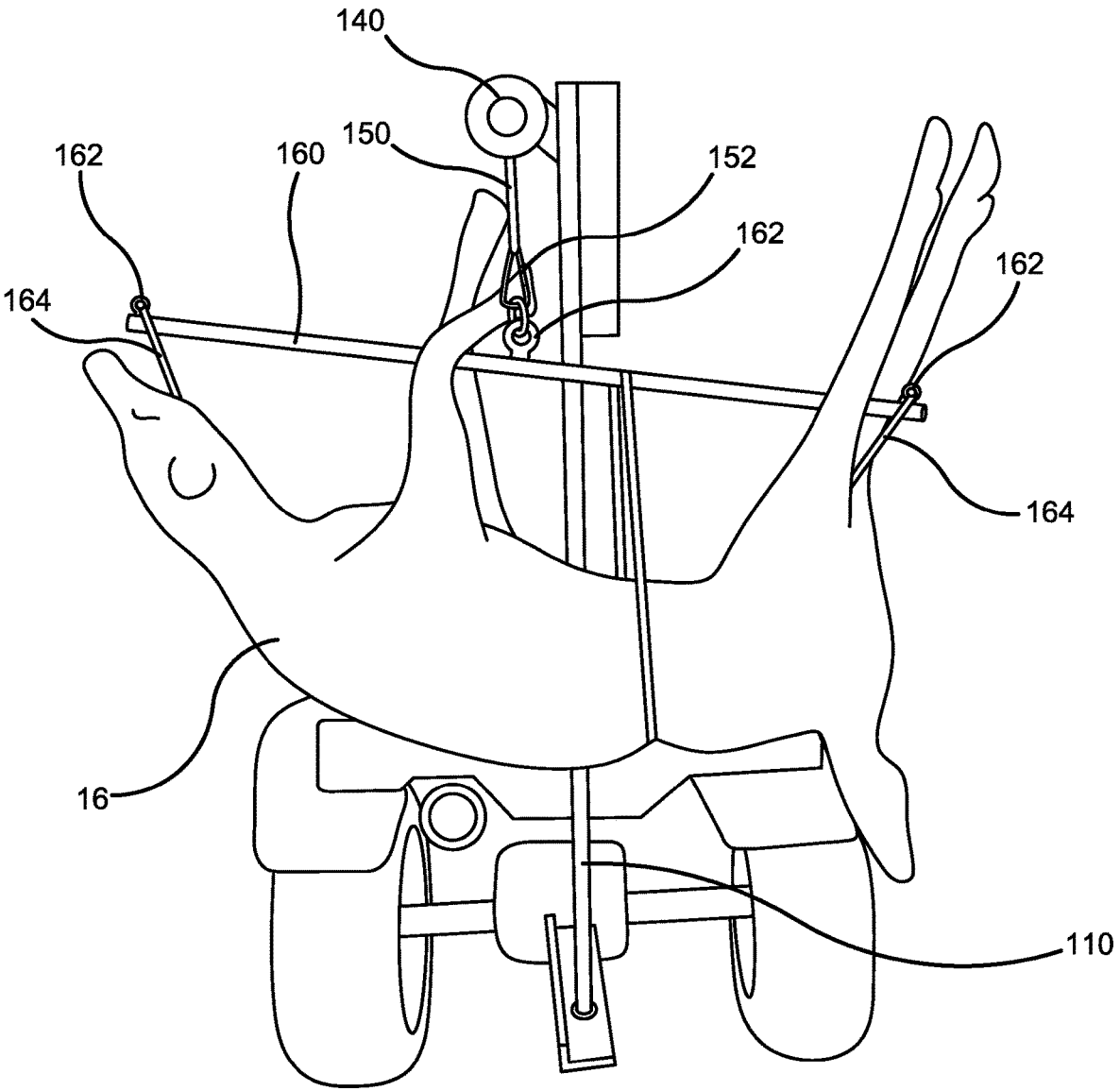
FIG. 3 illustrates a perspective view of one potential embodiment of a vehicle-mountable game animal lift device of the present invention while being used to lift a deer in accordance with the disclosed architecture.

FIG. 2 illustrates a perspective view of one potential embodiment of a vehicle-mountable game animal lift device 100 of the present invention in accordance with the disclosed architecture. The second end 130 of the vertical mast 110 is comprised of a winch 140. The winch 140 may be further comprised of an at least one crank handle 142, an at least one cable 150, and an at least one clip 152. The crank handle 142 may be turned or cranked clockwise causing the winch 140 to pull the cable 150 upward and turned or cranked counterclockwise to cause the cable 150 to move downward. Attached to the end of the cable 150 is at least one clip 152 from which at least one hanging bar 160 may be attached. The clip 152 may be any clip 152 known in the art such as, but not limited to: a carabiner, a locking clip, a trigger clip, a dog clip, a swivel J hook, a split ring, a lobster claw, etc. The hanging bar 160 may be further comprised of an at least one eyelet 162, from which the clip 152 may attach, and an at least one rope 164. The eyelet 162 may be attached to the hanging bar 160 at any location on the hanging bar 160. The hanging bar 160 may also be of any length, width, or other dimension to accommodate different sizes of game animals. The rope 164 may be tied in a knot, securing various portions of a deer 16 or other game animal to the hanging bar (as best seen in FIG. 3). In differing embodiments, the rope 164 may be a metal-braided rope or a rope made of a natural or synthetic fiber. The rope 164 may also have at least one clip 152 that allows the rope 164 to be easily tightened/secured around the body of a deer 16 or other game animal.

To lift heavy game animals, such as, but not limited to, deer 16, one potential embodiment of the device 100 may allow for the winch 140 to be powered by a motor 146. The motor 146 may be attached to the second end 130 of the vertical mast 110 or to the winch 140 via an at least one fastener 170. The motor 146 may be powered by a battery 148 and controlled via an at least one button 144. In the preferred embodiment, the motor 146 may be controlled by two buttons 144 such that by pressing one button 144, the game animal may be lifted off the ground and by pressing the other button 144, the game animal may be lowered back to the ground. The battery 148 may be a disposable battery or a rechargeable battery in the form of an alkaline, nickel-cadmium, nickel-metal hydride battery, etc. such as any 3V-12volts DC battery or other conventional battery such as A, AA, AAA, etc. that supply power to the device 100. Throughout this specification the term "battery" 148 may be used interchangeably to refer to one or more wet or dry cells or batteries of cells in which chemical energy is converted into electricity and used as a source of DC power. References to recharging or replacing the battery 148 may refer to recharging or replacing individual cells, individual batteries of cells, or a package of multiple battery cells as is appropriate for any given battery technology that may be used. In another potential embodiment of the device 100, the winch 140 may be able to be powered manually by the crank handle 142 or automatically by the motor 146. In this embodiment, the individual may be able to choose the desired method for lifting the deer 16 or other game animal from the ground and onto the device 100. In addition, in the case of the battery 148 dying or malfunctioning, the deer 16 may still be able to be lifted onto the device 100 and transported out of the hunting area on the ATV 10.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "vehicle-mountable game animal lift device" and "device" are interchangeable and refer to the vehicle-mountable game animal lift device 100 of the present invention.

Notwithstanding the foregoing, the vehicle-mountable game animal lift device 100 of the present invention and its various components can be of any suitable size and configuration as is known in the art without affecting the overall concept of the invention, provided that they accomplish the above-stated objectives. One of ordinary skill in the art will appreciate that the size, configuration and material of the vehicle-mountable game animal lift device 100 as shown in the FIGS. are for illustrative purposes only, and that many other sizes and shapes of the vehicle-mountable game animal lift device 100 are well within the scope of the present disclosure. Although the dimensions of the vehicle-mountable game animal lift device 100 are important design parameters for user convenience, the vehicle-mountable game animal lift device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle-mounted game animal lift device comprising:
a vertical mast comprising a lower end and an upper end;
a winch;
a crank handle;
a cable;
a locking clip attached to a distal end of the cable;
an L-shaped mounting bracket magnetically attachable to the lower end of the vertical mast at one end and removably attachable to a vehicle tow hitch at an opposing end;
a support bracket attached to a center of the vertical mast between the lower and upper ends and configured to secure a middle portion of the vertical mast to a vehicle; and
a hanging bar.

2. The vehicle-mounted game animal lift device of claim 1, wherein the crank handle can be rotated to control the winch.

3. The vehicle-mounted game animal lift device of claim 1, wherein the hanging bar is further comprised of an eyelet.

4. The vehicle-mounted game animal lift device of claim 1, wherein the hanging bar attaches to the locking clip.

5. The vehicle-mounted game animal lift device of claim 1, wherein the winch raises and lowers the hanging bar.

6. A vehicle-mountable game animal lift device comprising:
a vertical mast comprising a lower end and an upper end;
a winch;
a crank handle;
a cable;
a motor;
a battery;
a button;
a swivel J hook attached to a distal end of the cable;
an L-shaped mounting bracket adhesively attachable to the lower end of the vertical mast at one end and removably attachable to a vehicle tow hitch at an opposing end;
a support bracket attached to a center of the vertical mast between the lower and upper ends and configured to secure a middle portion of the vertical mast to a vehicle; and
a hanging bar attachable to the swivel clip and comprising a rope and a clip attached to the rope; and
wherein the vertical mast, the L-shaped mounting bracket, the support bracket, and the hanging bar are plastic.

7. The vehicle-mountable game animal lift device of claim 6, wherein the crank handle can be rotated to control the winch.

8. The vehicle-mountable game animal lift device of claim 6, wherein the motor can control the winch.

9. The vehicle-mountable game animal lift device of claim 8, wherein the button controls the motor.

10. The vehicle-mountable game animal lift device of claim 6, wherein the winch raises and lowers the hanging bar.

11. The vehicle-mountable game animal lift device of claim 6, wherein the motor is powered by the battery.

12. A vehicle-mountable game animal lift device comprising:
a vertical mast comprising a lower end and an upper end;
a winch attached to the vertical mast;
a crank handle attached to the winch;
a cable attached to the winch;
a motor;
a battery that powers the motor;
a button that controls the motor;
a split ring clip attached to a distal end of the cable opposite the winch;
an L-shaped mounting bracket magnetically attachable to the lower end of the vertical mast at one end and removably attachable to a vehicle tow hitch at an opposing end;
a support bracket attached to a center of the vertical mast between the lower and upper ends and configured to secure a middle portion of the vertical mast to a vehicle; and
a hanging bar comprising an eyelet for securing the hanging bar to the cable via the split ring clip, a metal-braided rope, and a clip attached to the metal-braided rope configured to adjustably secure an animal to the hanging bar; and
wherein the support bracket, and the hanging bar are aluminum.

13. The vehicle-mountable game animal lift device of claim 12, wherein the crank handle can be rotated to control the winch.

14. The vehicle-mountable game animal lift device of claim 12, wherein the motor can control the winch.

15. The vehicle-mountable game animal lift device of claim 12, wherein the winch raises and lowers the cable.

16. The vehicle-mountable game animal lift device of claim 12, wherein the cable raises and lowers the hanging bar.

* * * * *